(12) United States Patent
Ferreira de Figueiredo

(10) Patent No.: US 8,698,538 B2
(45) Date of Patent: Apr. 15, 2014

(54) MULTIVOLTAGE CLOCK SYNCHRONIZATION

(75) Inventor: Pedro Miguel Ferreira de Figueiredo, S. Domingos de Rana (PT)

(73) Assignee: Synopsys, Inc, Mountain View, CA (US)

( * ) Notice: Subject to any disclaimer, the term of this patent is extended or adjusted under 35 U.S.C. 154(b) by 0 days.

(21) Appl. No.: 13/019,950

(22) Filed: Feb. 2, 2011

(65) Prior Publication Data
US 2012/0194255 A1 Aug. 2, 2012

(51) Int. Cl.
*G06F 1/04* (2006.01)
(52) U.S. Cl.
USPC .............................. 327/291; 327/99; 327/298
(58) Field of Classification Search
USPC ............ 327/99, 291, 298–299, 355, 360–361
See application file for complete search history.

(56) References Cited

U.S. PATENT DOCUMENTS

| | | | |
|---|---|---|---|
| 5,805,005 A | 9/1998 | Raisinghani et al. | |
| 6,693,457 B2 * | 2/2004 | Yepp | 326/63 |
| 7,251,740 B2 * | 7/2007 | Newman | 713/401 |
| 8,072,253 B2 * | 12/2011 | Kaeriyama et al. | 327/231 |
| 2003/0189477 A1 | 10/2003 | Schafer et al. | |

FOREIGN PATENT DOCUMENTS

| | | |
|---|---|---|
| RU | 2085030 C1 | 7/1997 |
| RU | 2104601 C1 | 2/1998 |

OTHER PUBLICATIONS

PCT International Search Report and Written Opinion, PCT Application No. PCT/US2012/023545, May 17, 2012, 7 pages.

* cited by examiner

*Primary Examiner* — An Luu
(74) *Attorney, Agent, or Firm* — Fenwick & West LLP

(57) ABSTRACT

A level converter circuit is disclosed. The level converter circuit includes a first level converter that generates a first output signal, and a second level converter that generates a second output signal. The level converter circuit further includes an edge selector coupled to the first level converter and the second level converter that selects a rising edge of either the first output signal or the second output signal, and selects a falling edge of either the first output signal or the second output signal to generate an optimized output signal.

16 Claims, 8 Drawing Sheets

MULTIVOLTAGE CLOCK SYNCHRONIZATION

FIELD OF THE INVENTION

The present invention is generally related to digital computer systems.

BACKGROUND OF THE INVENTION

Analog circuits often need to distribute a clock signal to multiple voltage domains through the course of their operation. A common situation is in CMOS Analog-to-Digital Converters (ADCs) used in communication and video systems, where the input sampling switch is on 2.5/3.3 Volt domain and the core of the ADC is on 1.2 Volt domain. These two clock domains must be well aligned to allow high frequency operation with low sampling jitter and distortion. In fact, this misalignment is often one of the major sources of distortion on a high-speed ADC. In certain conditions, it may even be the dominant factor.

The circuit of FIG. 1 is typically used for transferring the clock signal from the 1.2 V domain (LV—Low Voltage) to 2.5 V or 3.3 V domain (HV—High Voltage). PMOS transistors (M3/M4) must be weaker than the lower NMOS (M1/M2), to ensure correct operation. One of the transitions depends on the positive feedback of the upper PMOS transistors, and so it is always slower.

In the circuit of FIG. 1, the minimum input-to-output delay is when $clk_{LV}$ goes low, which makes M2 push $clk1_{HV}$ to low. On the other transition, M1 must first push its drain voltage down, and then M4 pushes $clk1_{HV}$ to high, which takes more time.

As shown in FIG. 2, this effect distorts the output duty cycle (38%-47% with 1 GHz clock), thereby misaligning the output clock at HV from the original LV one.

The level converter shown in FIG. 3 operates on the complementary output, and its minimum input-to-output delay is when $clk_{LV}$ (and thus when $clk2_{HV}$) goes high. The output duty cycle is also distorted, but in the opposite direction (56%-67% with 1 GHz clock, as shown in FIG. 4).

Several improved level converter circuits have been proposed in literature, but none addresses the fundamental asymmetry, described above, that generates transition dependent delay times.

This is a serious problem, because to align the LV clocks with the HV clocks, a delay must be added to the LV clock. For this alignment to be effective the level converter must present a similar propagation delay in the two edges—this is achieved by maintaining the duty-cycle in the LV-to-HV conversion. Furthermore, to enhance the alignment robustness across process, temperature and supply voltage variations, it is also important to minimize the propagation delay of the level converter.

SUMMARY OF THE INVENTION

Embodiments of the present invention solve the problem whereby in order to align low-voltage clocks with high voltage clocks, a delay must be added to the low-voltage clock. Furthermore, embodiments of the present invention also ensure that the duty-cycle is maintained on the low-voltage to high voltage conversion in order to maintain an effective alignment.

In one embodiment, the present invention is implemented as a level converter circuit. The level converter circuit includes a first level converter that generates a first output signal, and a second level converter that generates a second output signal. The level converter circuit further includes an edge selector coupled to the first level converter and the second level converter that selects a rising edge of either the first output signal or the second output signal, and selects a falling edge of either the first output signal or the second output signal to generate an optimized output signal.

In one embodiment, the present invention is implemented as an improved low-to-high level converter, where the output clock is constructed from the best edge of two complementary level converters. Additionally, embodiments of the present invention utilize the outputs of the 2 problem entry level converters, wherein the first has the minimum propagation delay in the high to low transition, and wherein the second has the minimum propagation delay in the low to high transition.

In this manner, embodiments of the present invention solve the duty cycle distortion problem that occurs with conventional implementations and offers minimum delay. When used in high-speed/high-resolution ADCs, embodiments of the present invention improve the distortion at the sampling network significantly. This improvement occurs because embodiments of the present invention advantageously maximize the sampling time which, in conventional implementations, is significantly reduced.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
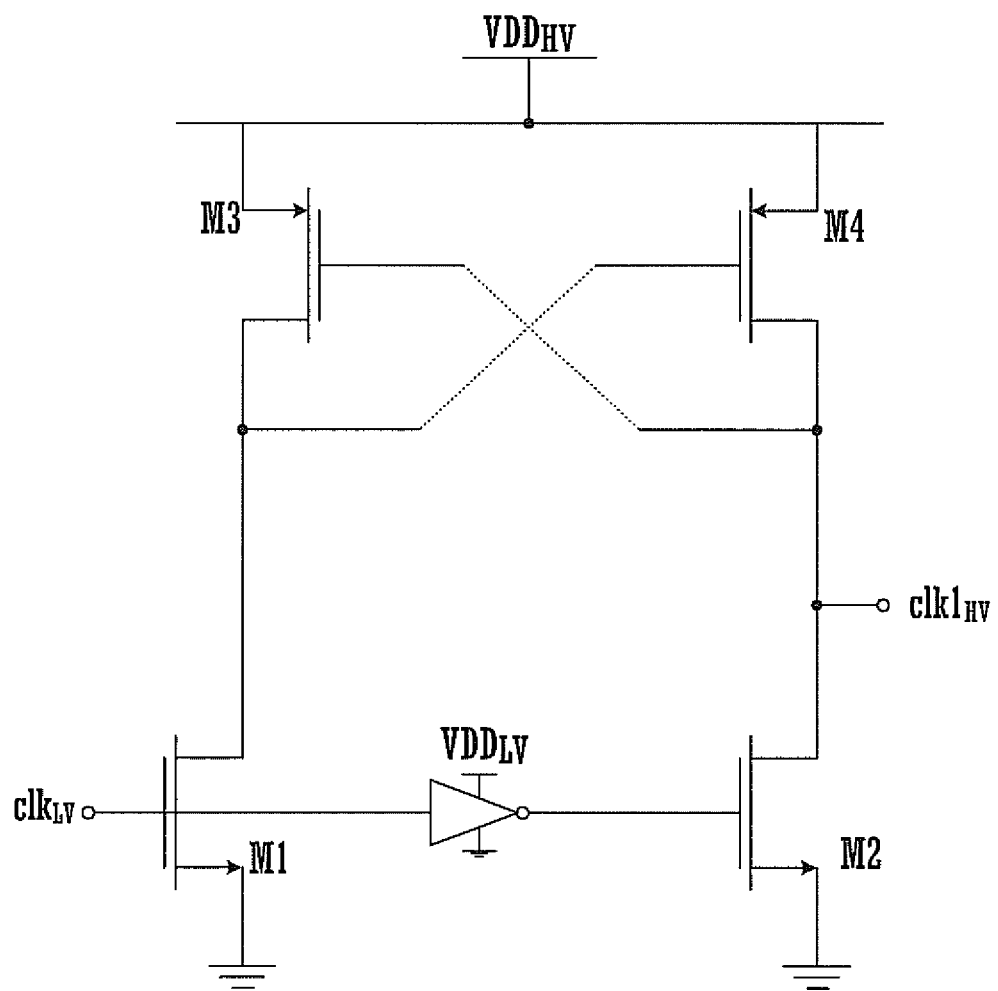
FIG. 1 shows a conventional level converter circuit in accordance with the prior art.
Figure 2:
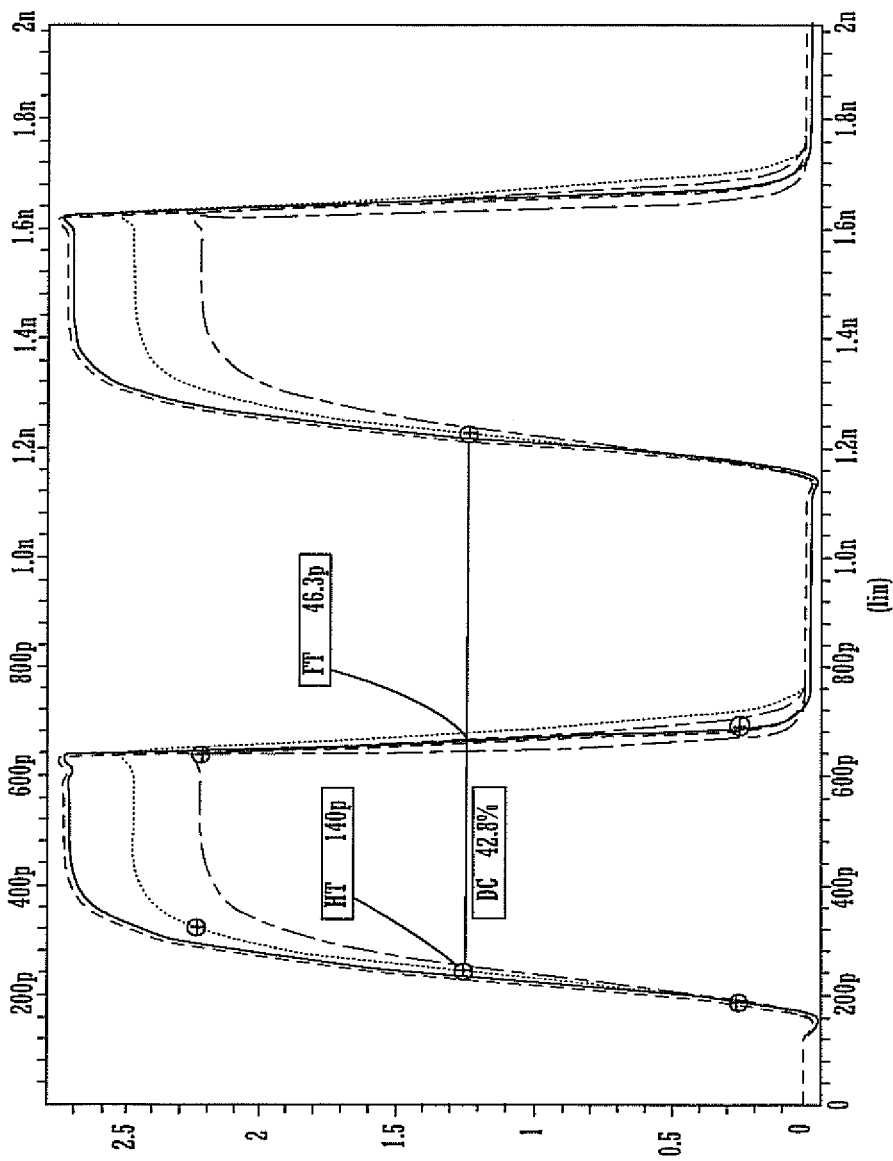
FIG. 2 shows an output diagram of a level converter circuit in accordance with the prior art.
Figure 3:
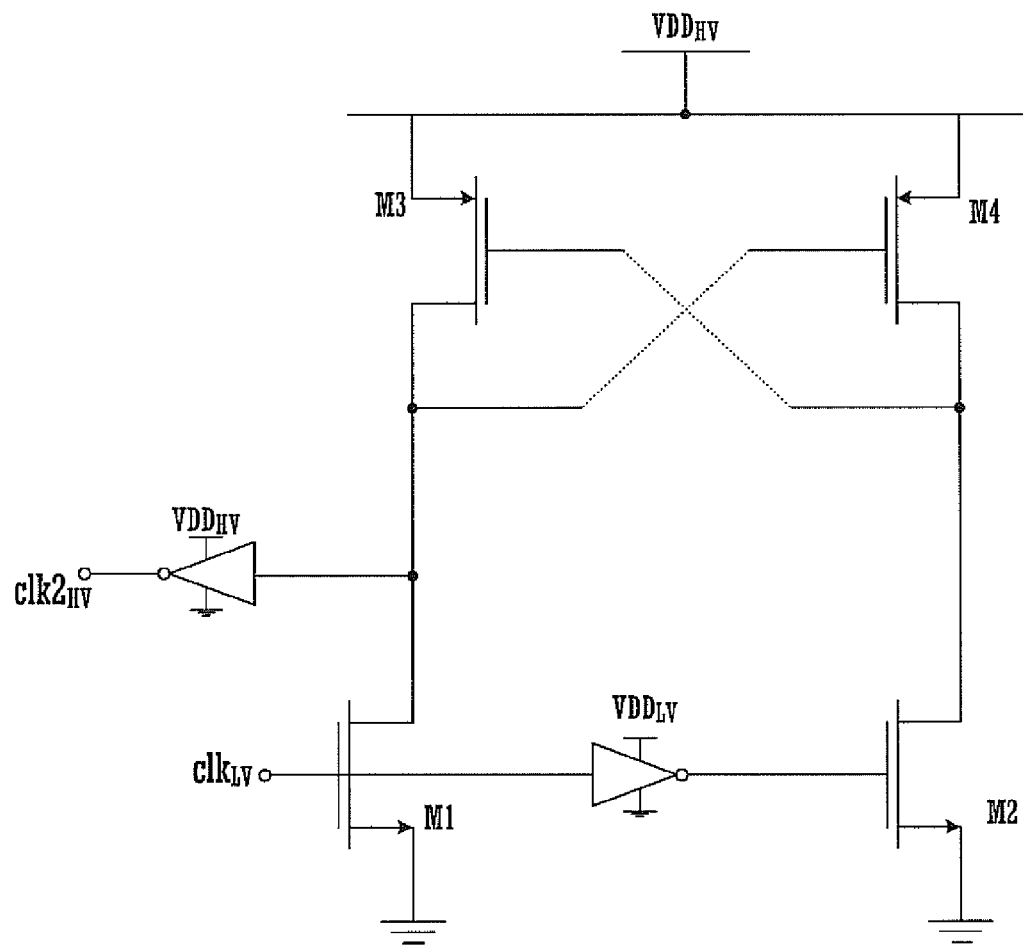
FIG. 3 shows a second conventional level converter circuit in accordance with the prior art.
Figure 4:
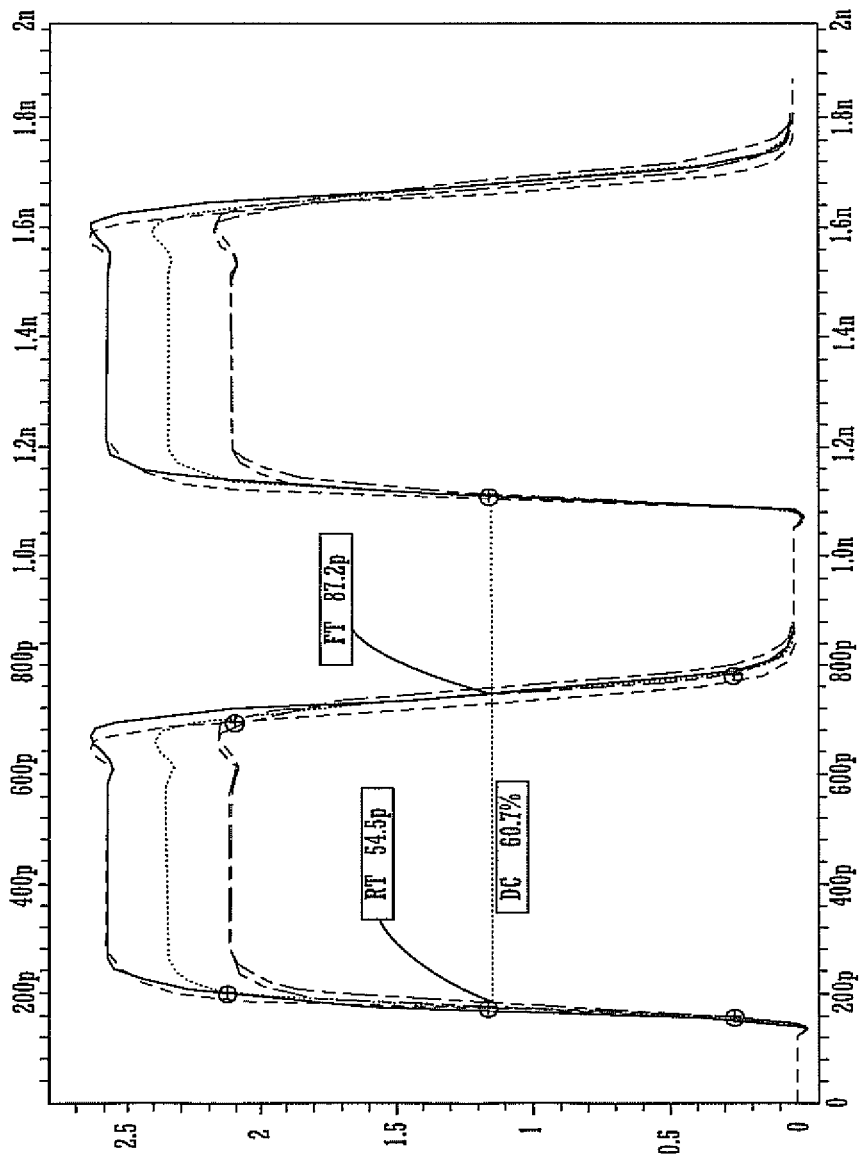
FIG. 4 an output diagram of a level converter circuit in accordance with the prior art.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art.

A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 5:
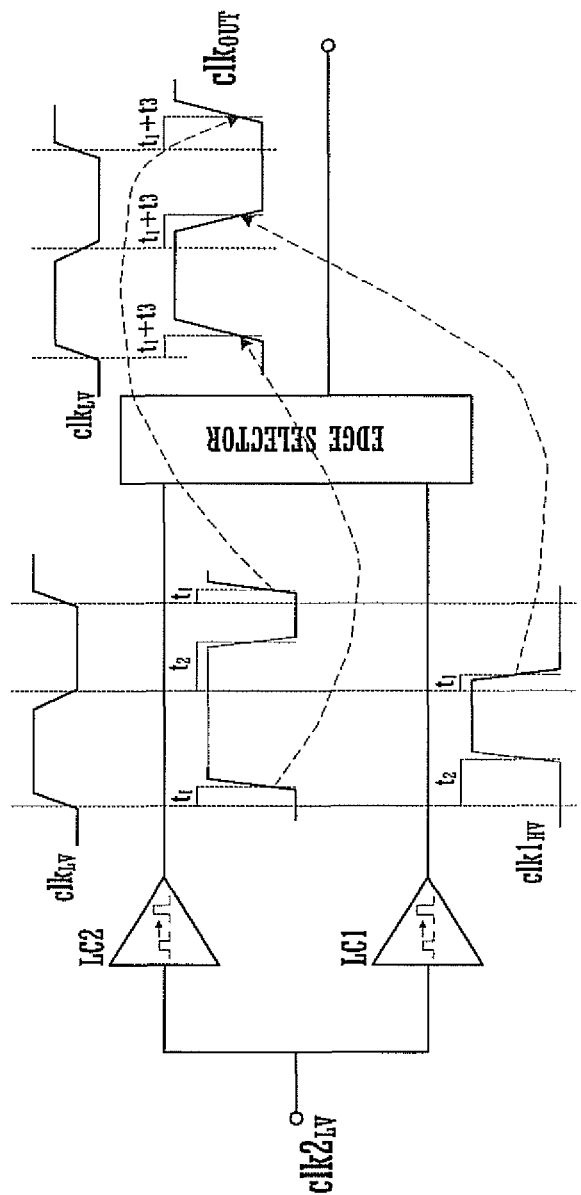
FIG. 5 shows a level converter circuit generating aligned clock signals in accordance with one embodiment of the present invention.

FIG. 5 shows a level converter in accordance with one embodiment of the present invention. As depicted in FIG. 5, an exemplary operating circuit is shown, where there are 2 level converters, one of each kind, followed by a circuit that "constructs" the output clock using the best edge. As used herein, the term "best edge" the one edge having the lowest delay time of each level converter.

Figure 6:
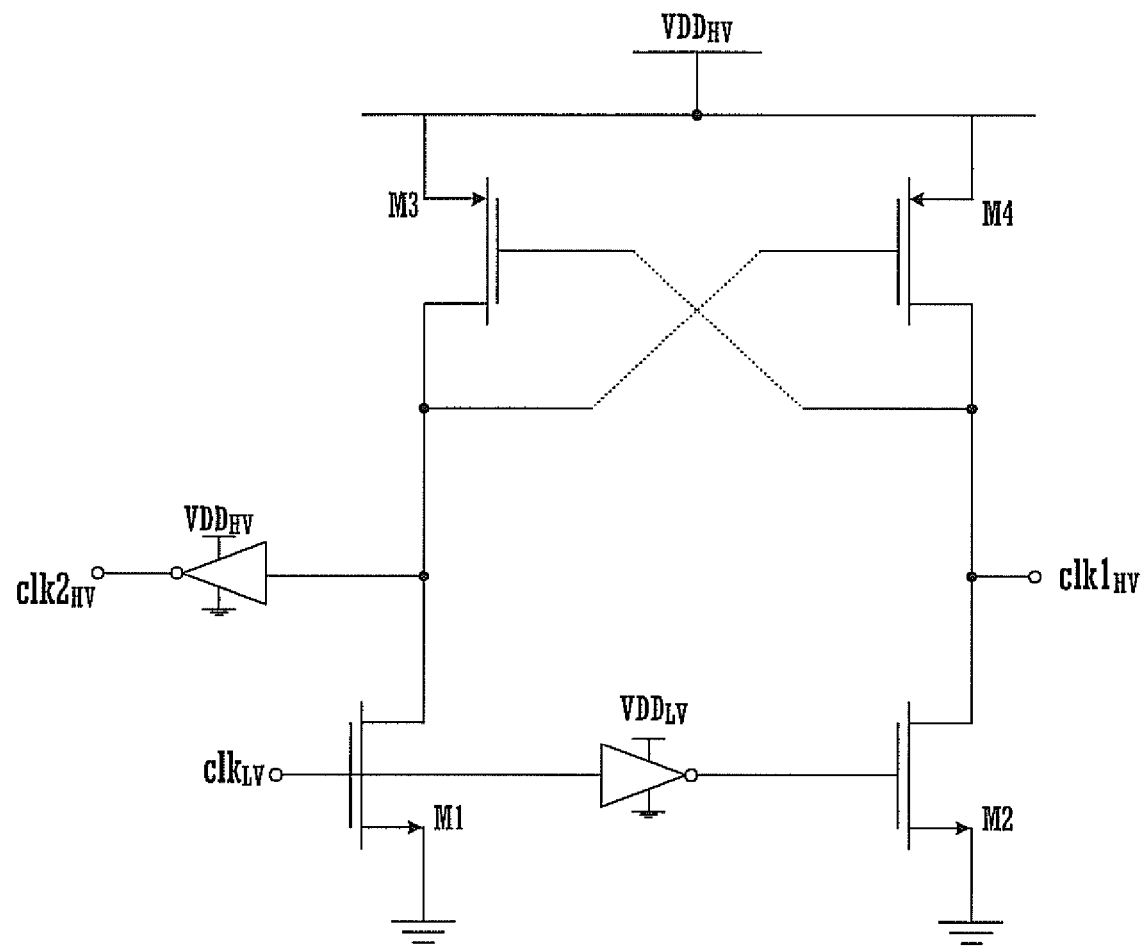
FIG. 6 shows a level converter circuit used as building block in one embodiment of the present invention.

FIG. 6 shows a level converter in accordance with an alternative embodiment of the present invention. As depicted in the FIG. 6 embodiment, it should be seen that $clk1_{HV}$ has the minimum input-to-output delay is when $clk_{LV}$ goes from high to low, and $clk2_{HV}$ has the minimum input-to-output delay is when $clk_{LV}$ goes from low to high.

Figure 7:
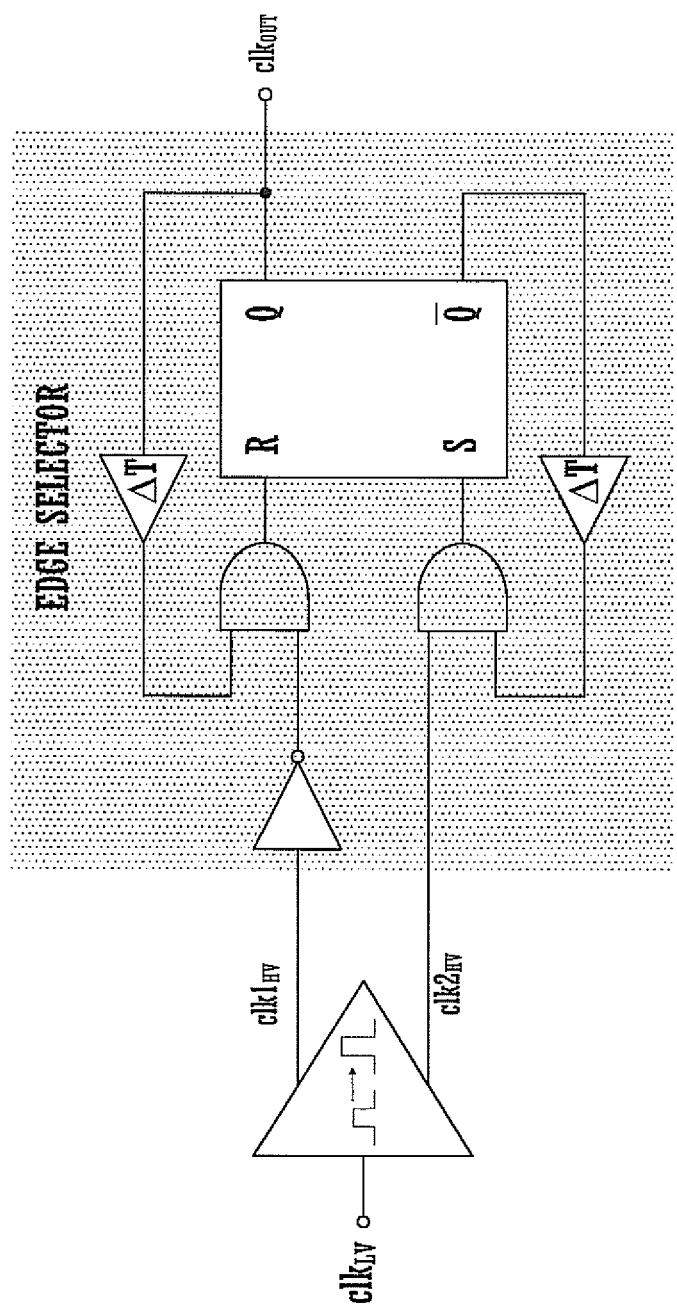
FIG. 7 shows a level converter circuit implementation in accordance with one embodiment of the present invention.

FIG. 7 shows an implementation of a level converter in accordance with one embodiment of the present invention. The FIG. 7 embodiment illustrates an implementation of the concept depicted in FIG. 5, using the level converter of FIG. 6. In the FIG. 7 embodiment, the $clk_{LV}$ rising edge $clk2_{HV}$ goes high first, which makes the S (set) input of the latch go high, thus causing $clk_{OUT}$ to go high. The feedback through the delays $\Delta T$ and the AND gates causes the set input to go low a bit after, and the latch memorizes the previous state ($clk_{OUT}$=high).

In one embodiment, in the $clk_{LV}$ falling edge $clk1_{HV}$ goes low first, which makes the R (reset) input of the latch go high, thus causing $clk_{OUT}$ to go low. As in the other edge, due to the feedback through the delays $\Delta T$ and the AND gates, the R input goes low a bit after, which causes the latch to memorize $clk_{OUT}$=low.

In one embodiment, for proper operation, the delays $\Delta T$ need to be high enough so that the modification of the output state, due to the set/reset of the latch, only reaches the input of the AND gates after transition from the slowest level converter has occurred.

Figure 8:
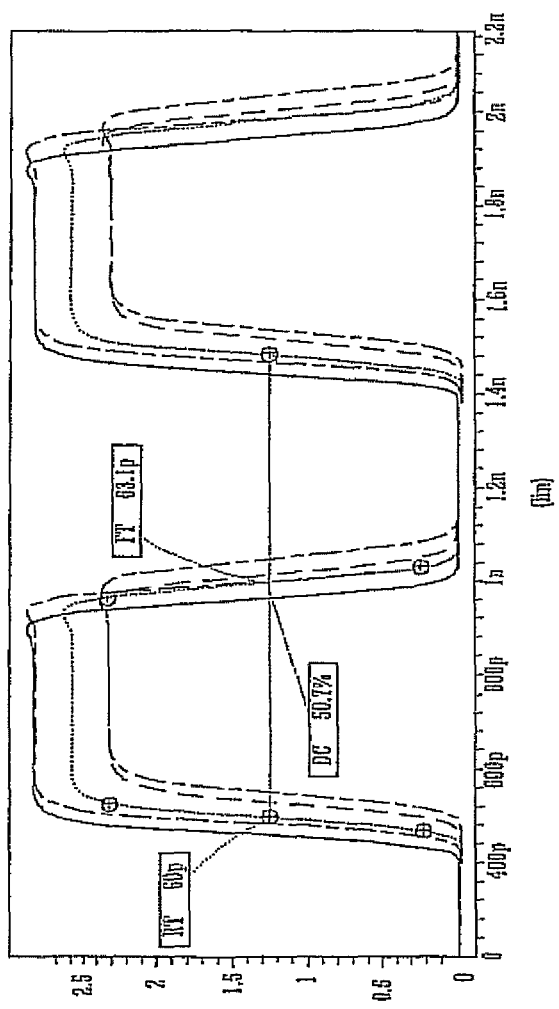
FIG. 8 shows an output diagram of a level converter circuit in accordance with one embodiment of the present invention.

FIG. 8 shows a timing output diagram depicting the operation of an exemplary level converter circuit in accordance with one embodiment of the present invention. Specifically, FIG. 8 illustrates the output clock using the solution of FIG. 7, which, in the present embodiment, has a duty cycle in the 48%-52% range.

It should be noted that symmetrical duty-cycle and minimum delay allow efficient synchronization with the LV clock by adding matching delays.

In this manner, embodiments of the present invention implement an improved low-to-high level converter, where the output clock is constructed from the best edge of two complementary level converters. Additionally, embodiments of the present invention utilize the outputs of the 2 complementary level converters, wherein the first has the minimum propagation delay in the high to low transition, and wherein the second has the minimum propagation delay in the low to high transition.

In this manner, embodiments of the present invention solve the duty cycle distortion problem that occurs with conventional implementations and offers minimum delay. When used in high-speed/high-resolution ADCs, embodiments of the present invention improve the distortion at the sampling network significantly. This improvement occurs because embodiments of the present invention advantageously maximize the sampling time which, in conventional implementations, is significantly reduced.

A number of different applications would benefit immensely from the above-described advantages. Such applications include, for example, a number of different systems where it is necessary to convert digital signals to different voltage domains, and where it is important that they are maintained with the same duty cycle, and aligned with each other. Examples include, but are not limited to, various ADC architectures (e.g., Pipeline, Sigma-Delta, SAR ADCs, etc.), and also Digital-to-Analog Converters (DACs).

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A level converter circuit, comprising:
    a first level converter that generates a first output signal;
    a second level converter that generates a second output signal;
    an edge selector coupled to the first level converter and the second level converter that selects a rising edge of either the first output signal or the second output signal, and selects a falling edge of either the first output signal or the second output signal to generate a level converted output signal; and
    a first delay element and a second delay element coupled to the edge selector to maintain a symmetrical duty-cycle of the level converted output signal,
        the first delay element having a first propagation delay, an input coupled to receive the level converted output signal of the edge selector, and an output coupled to a first input of the edge selector, and
        the second delay element having a second propagation delay, an input coupled to receive an inverted level converted output signal of the edge selector, and an output coupled to a second input of the edge selector.

2. The level converter circuit of claim 1, wherein the first output signal and the second output signal are at a higher voltage than an input signal of the first level converter and an input signal of the second level converter.

3. The level converter circuit of claim 1, wherein the first delay element and the second delay element are sized to impose a minimum delay to the level converted output signal.

4. The level converter circuit of claim 1, wherein the first output signal, the second output signal, and the level converted output signal comprise clock signals.

5. The level converter circuit of claim 1, wherein the first output signal, the second output signal, and the level converted output signal comprise clock signals from a first voltage domain, and wherein an input signal of the first level converter and an input signal of the second level converter comprise clock signals from a second voltage domain that is different from the first voltage domain.

6. The level converter circuit of claim 1, wherein the edge selector further comprises a latch that selects the rising edge of either the first output signal or the second output signal, and selects the falling edge of either the first output signal or the second output signal to generate the a level converted output signal.

7. An integrated circuit device, comprising:
    a first level converter that generates a first output signal;
    a second level converter that generates a second output signal;
    an edge selector comprising a latch coupled to the first level converter and the second level converter, the latch selects a rising edge of either the first output signal or the second output signal, and selects a falling edge of either the first output signal or the second output signal to generate a level converted output signal;
    a first delay element having a first propagation delay, the first delay element configured to:
        receive a first output signal of the latch, and
        reset the latch; and
    a second delay element having second propagation delay, the second delay element configured to:
        receive a second output signal of the latch, and set the latch.

8. The integrated circuit device of claim 7, wherein the first output signal and the second output signal are at a higher voltage than an input signal of the first level converter and an input signal of the second level converter.

9. The integrated circuit device of claim 7, wherein the first delay element and the second delay element are coupled to the edge selector to maintain a symmetrical duty-cycle of the level converted output signal.

10. The integrated circuit device of claim 7, wherein the first delay element and the second delay element are coupled to the edge selector and are sized to impose a minimum delay to the level converted output signal.

11. The integrated circuit device of claim 7, wherein the first output signal, the second output signal, and the level converted output signal comprise clock signals.

12. The integrated circuit device of claim 7, wherein the first output signal, the second output signal, and the level converted output signal comprise clock signals from a first voltage domain, and wherein an input signal of the first level converter and an input signal of the second level converter comprise clock signals from a second voltage domain that is different from the first voltage domain.

13. A CMOS integrated circuit device, comprising:
    a first level converter that generates a first output signal;
    a second level converter that generates a second output signal; and
    an edge selector coupled to the first level converter and the second level converter, and generating a level converted output signal, wherein the edge selector further comprises:
        a latch that selects a rising edge of either the first output signal or the second output signal, and selects a falling edge of either the first output signal or the second output signal to generate the level converted output signal,
        a first delay element configured to set the latch, and
        a second delay element configured to reset the latch.

14. The CMOS integrated circuit device of claim 13, wherein the first output signal and the second output signal are at a higher voltage than an input signal of the first level converter and an input signal of the second level converter.

15. The CMOS integrated circuit device of claim 13, wherein the first delay element and the second delay element are coupled to the edge selector to maintain a symmetrical duty-cycle of the level converted output signal, and wherein the first delay element and the second delay element are sized to impose a minimum delay to the level converted output signal.

16. The CMOS integrated circuit device of claim 13, wherein the first output signal, the second output signal, and the level converted output signal comprise clock signals.

* * * * *